United States Patent
Triplett et al.

(10) Patent No.: US 11,561,457 B1
(45) Date of Patent: Jan. 24, 2023

(54) CAMERA APPARATUS

(71) Applicant: Camera Source, LLC, Muskego, WI (US)

(72) Inventors: Christopher Triplett, Muskego, WI (US); Kevin Pitterle, Watertown, WI (US)

(73) Assignee: Camera Source, LLC, Muskego, WI (US)

( * ) Notice: Subject to any disclaimer, the term of this patent is extended or adjusted under 35 U.S.C. 154(b) by 0 days.

(21) Appl. No.: 17/879,735

(22) Filed: Aug. 2, 2022

(51) Int. Cl.
*G03B 15/05* (2021.01)

(52) U.S. Cl.
CPC .................... *G03B 15/05* (2013.01)

(58) Field of Classification Search
CPC .... F16M 11/04; F16M 11/041; F16M 11/043; F16M 11/045; F16M 11/06; F16M 11/08; F16M 11/10; F16M 11/16; F16M 11/18; F16M 11/2007; F16M 11/2014; F16M 11/2021; F16M 11/2085; F16M 11/22; F16M 13/00; F16M 13/02; F16M 13/022; F16M 13/025; F16M 13/027; G03B 15/05; G03B 17/56; G03B 17/561; G03B 17/566; G03B 17/08
See application file for complete search history.

(56) References Cited

U.S. PATENT DOCUMENTS

| | | | |
|---|---|---|---|
| 7,195,405 B2 | 3/2007 | Son | |
| 7,609,961 B2 | 10/2009 | Park | |
| 7,619,680 B1 | 11/2009 | Bingle et al. | |
| 7,883,064 B2 | 2/2011 | Luft et al. | |
| 8,207,835 B2 | 6/2012 | Schwartz et al. | |
| 8,792,003 B2 | 7/2014 | Nakamura | |
| 9,446,721 B2 | 9/2016 | Jagoda | |
| 9,937,876 B2 | 4/2018 | Bingle et al. | |
| 10,621,445 B2 | 4/2020 | Higgins | |
| 10,625,689 B2 | 4/2020 | Yang | |
| 10,787,112 B2 | 9/2020 | Bell | |
| 10,887,556 B2 | 1/2021 | Diaz et al. | |
| 2003/0090569 A1 | 5/2003 | Poechmueller | |
| 2005/0046696 A1 | 3/2005 | Lang et al. | |
| 2007/0171032 A1 | 7/2007 | Dayan et al. | |
| 2016/0191863 A1 | 6/2016 | Minikey, Jr. et al. | |

(Continued)

FOREIGN PATENT DOCUMENTS

| | | |
|---|---|---|
| DE | 20313003 U1 | 1/2005 |
| KR | 100693316 B1 | 3/2007 |

(Continued)

OTHER PUBLICATIONS

Christopher Triplett, "Third brake light of 2019 GMC Sierra", Muskego, WI USA, taken Aug. 3, 2021.

(Continued)

*Primary Examiner* — Clayton E. LaBalle
*Assistant Examiner* — Fang-Chi Chang

(57) ABSTRACT

A camera apparatus, system, and method to allow a camera to attach to a light assembly is disclosed which includes a camera housing configured to at least partially enclose a camera and further attach to a bracket, the bracket configured to attach to vehicle light assemblies of varying heights and to allow rotation and vertical adjustment of the camera housing.

16 Claims, 12 Drawing Sheets

(56) References Cited

U.S. PATENT DOCUMENTS

2021/0132475 A1* 5/2021 Sickler .................. B60R 16/023

FOREIGN PATENT DOCUMENTS

| KR | 20100094704 A | 8/2010 |
|---|---|---|
| KR | 101794084 B1 | 11/2017 |

OTHER PUBLICATIONS

Camera Source, LLC, "Factory camera relocation housing kit-Adjustable-COMING SOON!", https://camerasource.com/factory-camera-relocation-housing-kit-adjustable.html, website accessed Oct. 9, 2021, published Mar. 19, 2021.

Zorg North America LLC, "Multi-Vehicle LVDS Camera Relocation Kit", https://www.zorg-na.com/product/4210/ , Accessed Oct. 9, 2021.

Zorg North America LLC, "Zorg Exclusive Universal Thin Line 3rd Brake Lamp W/ 150 Degree Camera (CHMSL) 2201", https://www.zorg-na.com/product/zorg-3bl/, website accessed Aug. 2, 2022.

Zorg North America LLC, "Universal 3rd Brake Lamp (CHMSL) W/ IR Assist Camera 2203", https://www.zorg-na.com/product/2203/, website accessed Aug. 2, 2022.

Zorg North America LLC, "Nissan NV Van 3rd Brake Lamp W/ Camera", https://www.zorg-na.com/product/2206/, website accessed Aug. 2, 2022.

Zorg North America LLC, "Chevrolet Express Van 3rd Brake Lamp W/ Camera 2204", https://www.zorg-na.com/product/2204/, website accessed Aug. 2, 2022.

Zorg North America LLC, "Ford Transit Van 3rd Brake Lamp W/ Camera 2205", https://www.zorg-na.com/product/2205/, website accessed Aug. 2, 2022.

Zorg North America LLC, "Black Wide Angle AHD/CVBS Camera 180 Degree View", https://www.zorg-na.com/product/2003/, website accessed Aug. 2, 2022.

* cited by examiner

CAMERA APPARATUS

BACKGROUND OF THE INVENTION

1. Field of the Invention

Embodiments of the present disclosure relate generally to cameras secured to a light on a vehicle, such as an automobile or trailer.

2. Background

Many vehicles, such as automobiles or trailers, include a camera on the rear of the vehicle which is configured to operate with an electronic system to display what the lens of the camera views to a user inside the vehicle. These cameras are useful in a variety of applications, such as to assist a user in backing a vehicle up or in viewing blind spots. However, in some cases modifications may be made to the vehicle which may render the camera useless in its original location. One such example is on GM® branded trucks which include a camera as part of a third brake light located on the rear side of the truck cab, where the camera is faced rearward overlooking the bed of the truck. If a cap is added to back of the truck, this third brake light camera is rendered useless as its view is obstructed by the newly installed cap. It is desirous to be able to relocate a camera from one location to another location on the vehicle or to simply add another camera to a desirable location to accommodate such vehicle modifications. One example would be to relocate the camera in the previous example or to add a new camera to a brake light located on the back of the truck cap, or another location a light/light assembly may be placed. If a new camera is added, the previously installed camera cabling could be attached to the new camera. Additionally, in the case of a trailer, it would be advantageous to be able to attach a camera to a marker light or other type of light.

SUMMARY OF THE INVENTION

The invention relates, in one embodiment, to an apparatus configured to attach a camera to a light assembly on a vehicle, often due to having to relocate the camera from one light assembly to another, where the apparatus includes a camera housing configured to enclose at least a portion of a digital or analog camera, a bracket attached to the camera housing and configured to attach to a light cover or a light assembly, where the bracket is adjustable to attach to light covers or light assemblies of varying heights as well as allow the camera housing to rotate.

The invention relates, in another embodiment, to a system including a digital or analog camera at least partially enclosed in a camera housing which is configured to attach to an adjustable bracket, wherein the bracket is configured to secure to the outside of a light assembly. The camera bracket allows angle adjustment of the camera housing.

The invention relates, in another embodiment, to a method for attaching a camera to a vehicle including enclosing the camera within a camera housing, attaching an adjustable bracket to the camera housing, attaching the bracket to a light assembly on the vehicle, connecting a camera cable to the camera, and adjusting the camera housing.

DETAILED DESCRIPTION OF THE INVENTION

For the following defined terms, these definitions shall be applied, unless a different definition is given in the claims or elsewhere in this specification. All numeric values are herein assumed to be modified by the term "about," whether or not explicitly indicated. The term "about," in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified. Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary.

As used herein, the terms "bracket," "housing," and "assembly" is intended to mean any material used to form an enclosure. Examples of such material include but are not limited to rigid or semi-rigid materials like plastic, metal, cardboard, and wood. As used herein, the term "fastener" is intended to mean a screw, bolt, nail, rivet, anchor and any type used as a fastener.

Figure 1:
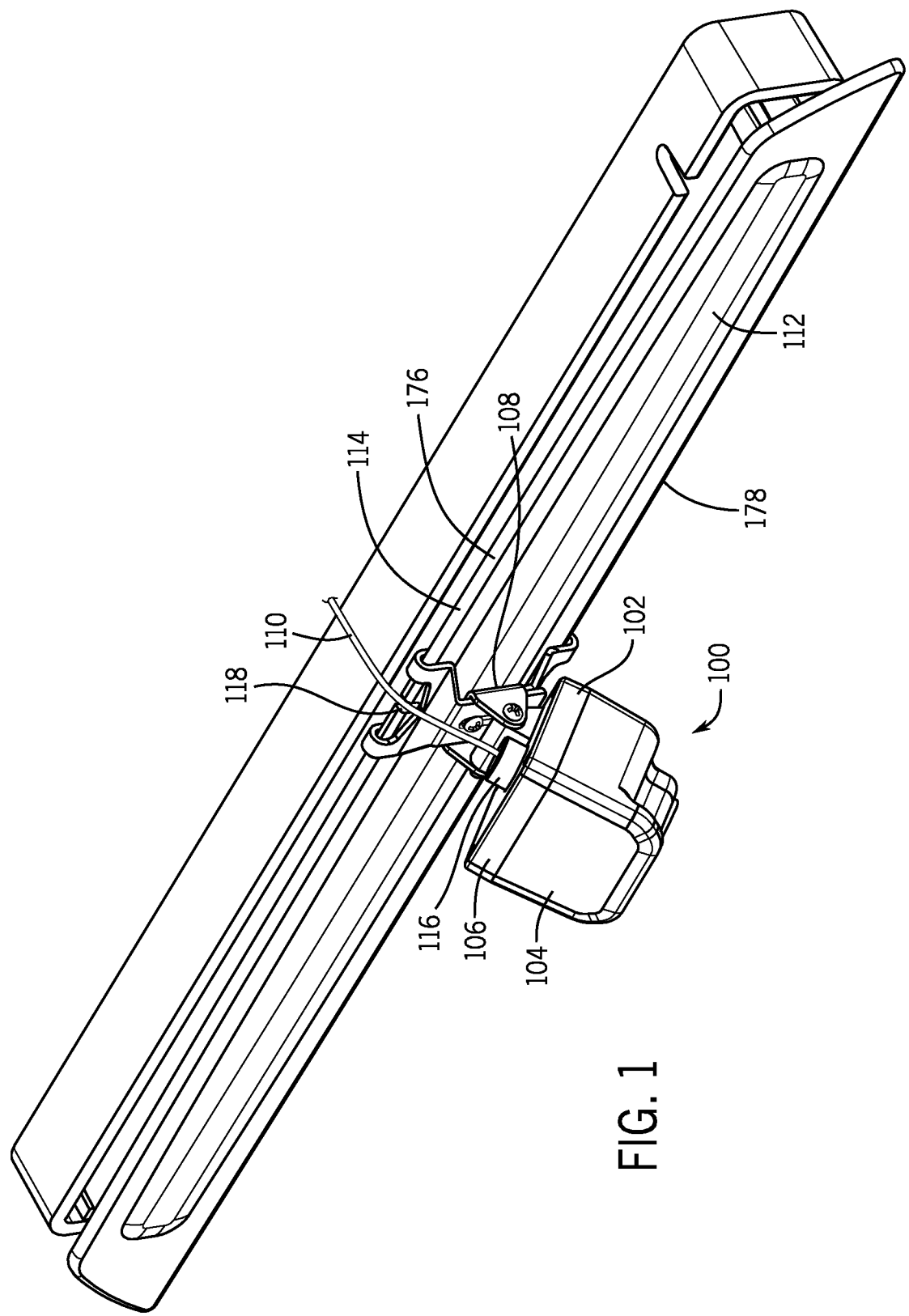
FIG. 1 is a top perspective view of an embodiment of the present invention.

A camera apparatus, system, and method will now be described with references in FIGS. 1-18. Turning to the drawings, where the reference characters indicate corresponding elements throughout the several figures, attention is first directed to FIG. 1 where a top perspective view of an embodiment of the camera apparatus is shown, illustrating its composition and the apparatus is generally indicated by reference character 100. Camera apparatus 100 comprises a camera housing 102 and a camera bracket 108, where camera housing 102 is generally square or rectangular shaped and further comprises a front housing 104 and a rear housing 106 configured to enclose at least a portion of a digital or analog camera 116 (see FIG. 2). Camera bracket 108 is configured to attach to rear housing 106 and to clamp to a light assembly 112, which may be the cover of a light on a vehicle, such as a truck, car, trailer, camper, etc. Light assembly 112 is generally the top or cover of a light emitting fixture (and thus has a light emitting surface) however light emitting sources (such as LED or light bulbs) could be enclosed within light assembly 112 as well. Light assembly 112 further comprises a lip 114 extending at least partially around the perimeter of the top surface of light assembly 112. In the present embodiment lip 114 comprises a top lip 176 extending along the top edge of light assembly 112 and a bottom lip 178 extending along the bottom edge of light assembly 112, wherein lip 114 extends generally parallel to the top surface of light assembly 112. Camera bracket 108 may also removably attach to a rail or other part of a vehicle with at least one lip upon which bracket 108 may secure (described below). Camera 116 connects to a cable 110 which extends from the back of camera 116 through a notch 118 cut into lip 114 of light assembly 112 to allow cable 110 to connect to a displaying mechanism, such as an LCD display (although notch 118 may not be required for all light assembly types). While the notch 118 is shown in one location, notch 118 may be located in any location in lip 114. While bracket 108 is removable from lip 114 and thus light assembly 112 in the current embodiment. Further, notch 118 could instead be an aperture formed therethrough lip 114 or other guide to control the direction of cable 110. It is contemplated in some embodiments, bracket 108 could permanently adhere to light assembly 112.

Figure 2:
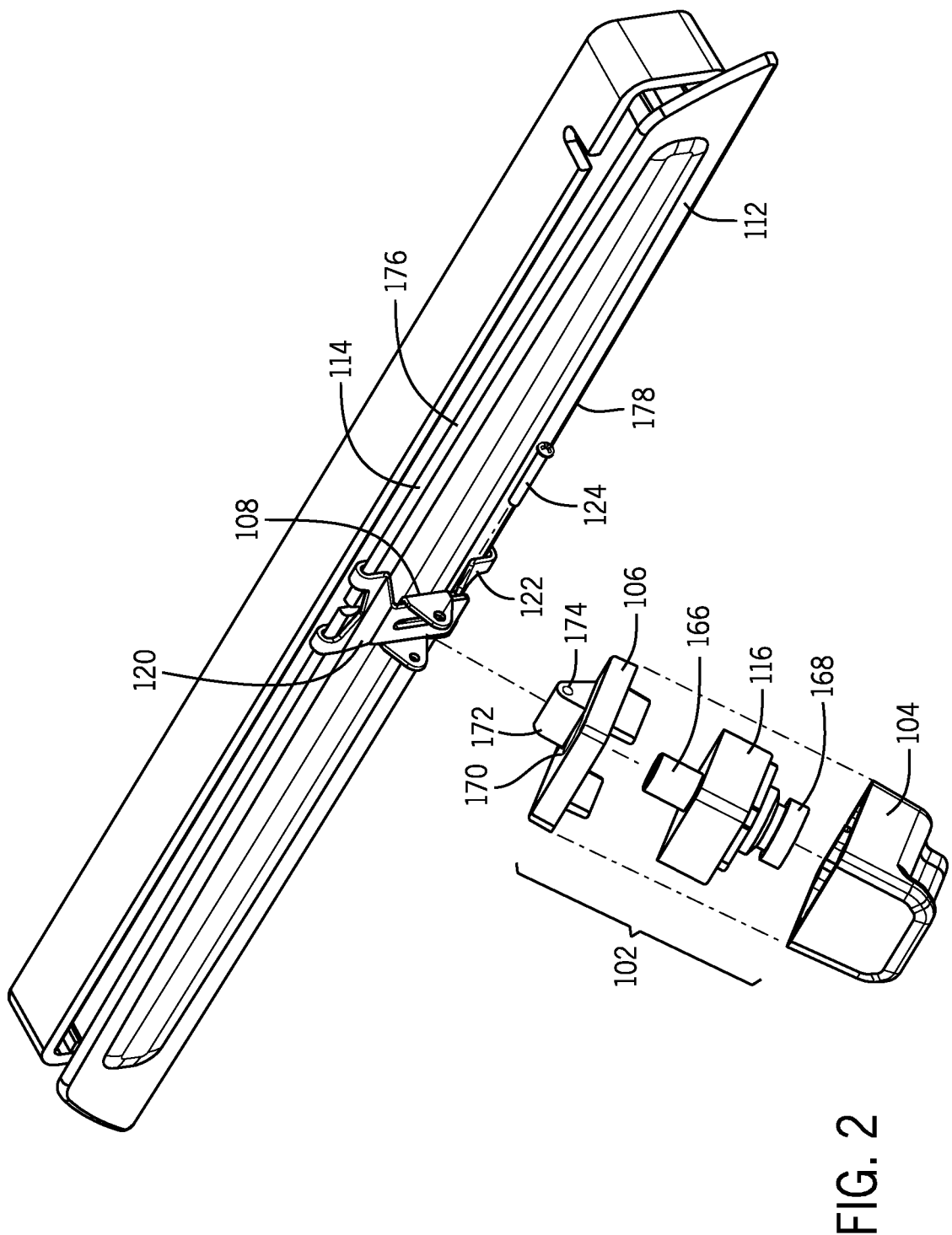
FIG. 2 is a partially exploded view of an embodiment of the present invention.

Turning to FIG. 2, a partially exploded view of an embodiment of camera apparatus 100 is shown. Camera 116 further comprises a body 252 (see FIGS. 10-11), a lens 168, and a plug 166 extending away from the back surface of body 252, wherein plug 166 is configured to attach to camera cable 110. Lens 168 is configured to extend through front aperture 158 in front camera housing 104 (see FIG. 5). Rear camera housing 106 comprises a rear aperture 170 formed therethrough the back and is configured to allow camera plug 166 to extend through it to allow camera cable 110 to attach to plug 166 (see also FIGS. 8-9). Rear camera housing 106 further comprises protuberance 172 with a through hole 174 formed therethrough and configured to receive a camera fastener 124 which connects rear camera housing 106 to bracket 108. Bracket 108 is comprised of an upper bracket assembly 120 and a lower bracket assembly 122, wherein lower bracket assembly 122 is connected to protuberance 172 via camera fastener 124, allowing camera housing 102 to rotate about bracket 108 for a desired view and to be secured at the desired angle by tightening camera fastener 124 thereby tightly securing protuberance 172 to lower bracket assembly 122. In addition, bracket 108 is secured to light assembly 112 when upper bracket assembly 120 is hooked to upper lip 176 and lower bracket assembly 122 is hooked to lower lip 178 and upper bracket assembly 120 and lower bracket assembly 122 are squeezed together and secured together by a bracket fastener 126, thereby sandwiching light assembly 112.

Figure 3:
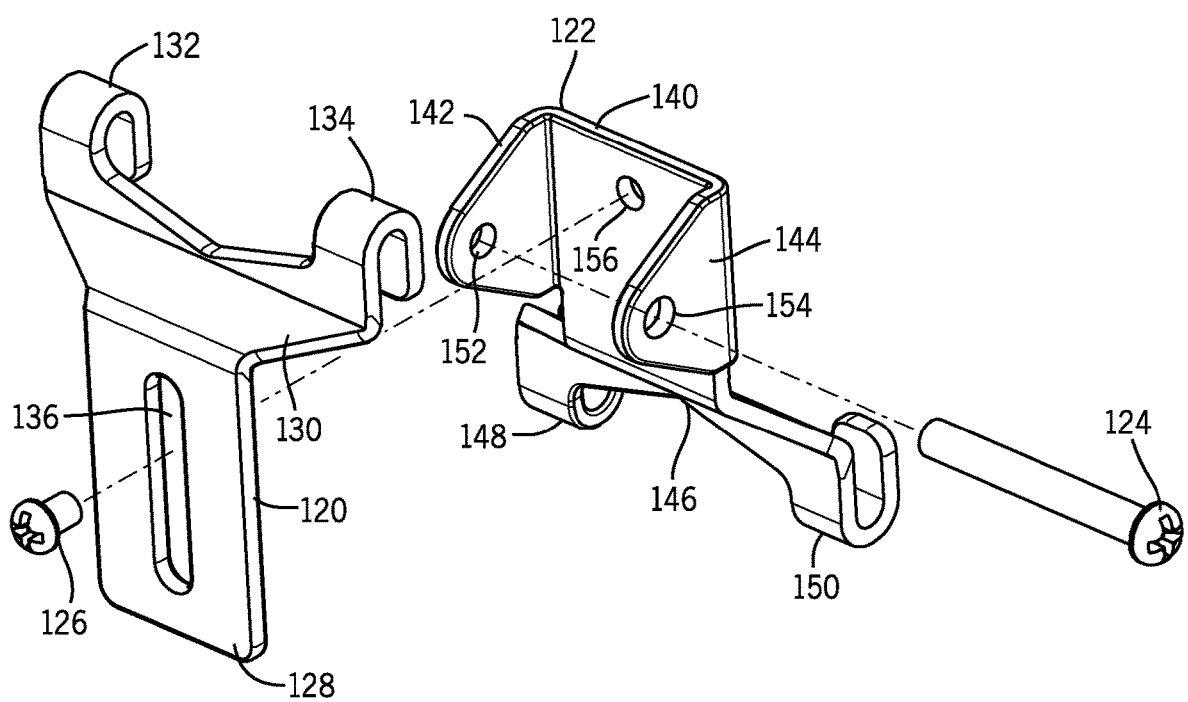
FIG. 3 is a front exploded view of an embodiment of bracket 108.
Figure 4:
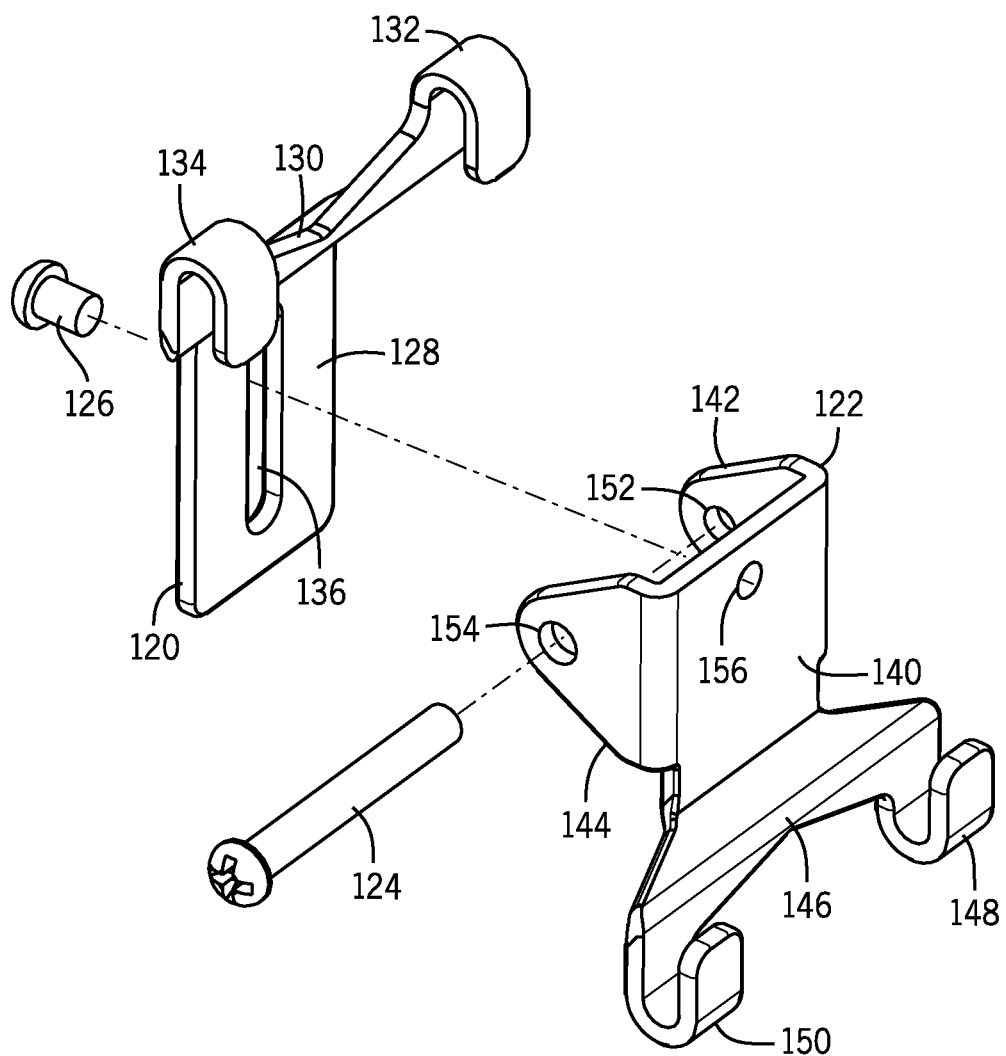
FIG. 4 is a rear exploded view of an embodiment of bracket 108.

Turing to FIGS. 3 and 4, a front exploded view and a rear exploded view of an embodiment of bracket 108 is shown. Upper bracket assembly 120 is in slidable communication with lower bracket assembly 122 and each assembly is fixed in their location to each other by bracket fastener 126 which extends through upper bracket assembly 120 and screws into or through lower bracket assembly 122. Upper bracket assembly 120 comprises a first plate 128 generally rectangular in shape connected along one of the widths to an upper plate assembly 130 which comprises a first hook 132 and a second hook 134. The portion of upper plate assembly 130 connected to first plate 128 is angled away from first plate 128 in order to accommodate any shapes, ridges, bumps, or protrusions that may be part of the top surface of light assembly 112, and then connected to first hook 132 located on one side of upper plate assembly 130 and second hook 134 located on the other side of upper plate assembly. First hook 132 and second hook 134 are parallel with first plate 128 and configured to hook on, or connect to, upper lip 176 of light assembly 112. It is contemplated alternative embodiments could include just a first hook 132 and hook 132 could be located centrally or in a different location to facilitate the same purpose (removable connection to upper lip 176). In addition, upper bracket assembly 120 further comprises slot 136 formed therethrough and centrally located and extending along the length of first plate 128 (the length can vary if desired to accommodate different light assembly configurations). Slot 136 is generally rectangular and configured to allow lower bracket assembly 122 to move vertically in relation to upper bracket 120 to adjust bracket 108 for different light assembly 112 shapes or heights. Slot 136 is configured to allow bracket fastener 126 to extend through slot 136 into orifice 156 of lower bracket assembly 122 to secure lower bracket assembly 122 to upper bracket assembly 120 at a desired height, thereby securing bracket 108 to light assembly 112. In addition, Bracket 108 is configured to allow easy access to fastener 126 for easy tightening and loosening to installing and removal from light assembly 112.

Lower bracket assembly 122 comprises second plate 140 which is generally square or rectangular and includes orifice 156 formed therethrough and configured to receive fastener 126. Orifice 156 is threaded in the current embodiment but is not required to if a different type of fastener 126 is used. Second plate 140 further comprises a first flange 142 connected to one side and extending perpendicular to second plate 140 and second flange 144 connect to the opposing side and extending perpendicular to second plate 140 (and parallel to first flange 142) wherein first flange 142 and second flange 144 are in line with one another. In the current embodiment first flange 142 and second flange 144 are triangular but could be any shape desired. First flange 142 comprises an aperture 152 formed therethrough and configured allow camera fastener 124 to screw into and/or through it, and second flange 144 comprises aperture 154 formed therethrough in a mirrored configuration to aperture 152 of first flange 142 and also configured to allow camera fastener 142 to screw into and/or through it. Through hole 174 of protuberance 172 lines up with apertures 152 and 154 for camera fastener 142 to screw into and/or through aperture 152, extend through hole 174 and screw into and/or extend through aperture 154 to secure rear camera housing 106 (and thereby camera housing 102) to bracket 108. Lower bracket assembly 122 further comprises lower plate assembly 146 configured in a mirrored bent configuration as upper plate assembly 130 and attached to the bottom of second plate 140. Lower plate assembly 146 further comprises a third hook 148 and a fourth hook 150 located on opposing sides of lower plate assembly 146, wherein both third hook 148 and fourth hook 150 are parallel with second plate 140 and configured to hook on, or connect to, lower lip 178 of light assembly 112. Further, the open part of first hook 132 faces the open part of third hook 148 and first hook 132 and third hook 148 are presently in line with one another. Likewise, the open part of second hook 134 faces the open part of fourth hook 150 and both hooks are in line with one another. It is contemplated alternative embodiments could include just a third hook 148 and third hook 148 could be located centrally or in a different location in order to facilitate the same purpose (removable connection to lower lip 178).

Figure 5:
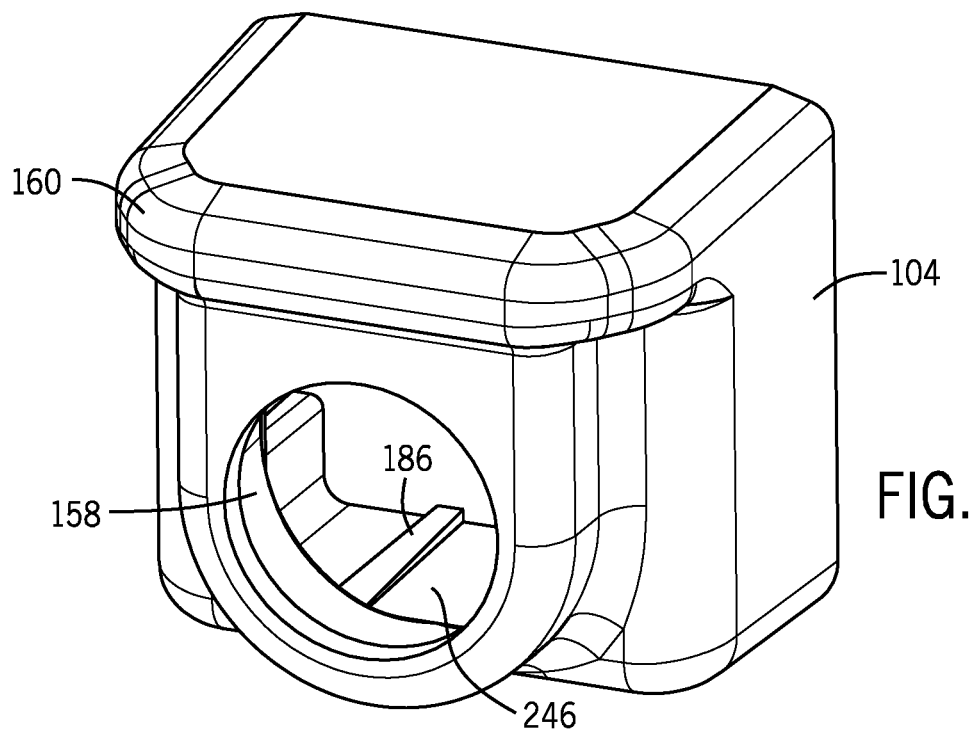
FIG. 5 is a perspective view of an embodiment of front camera housing 104.

Turning to FIG. 5, a front perspective view of an embodiment of front camera housing 104 is shown. Front camera housing 104 further comprises aperture 158 formed therethrough the front of camera housing 106 and is configured to allow lens 168 of camera 116 to extend through it so that camera 116 may operate as desired. Front camera housing 104 further comprises a hood 160 located around the top of front camera housing 104, and extends away from the front, at least a portion of the right side, and at least a portion of the left side of the housing and is configured to keep rain and debris away from lens 168, which may otherwise obscure the view from the lens. In the current embodiment hood 160 is rounded, but it may be any desired shape which performs the same stated purpose. Front camera housing 104 (and rear camera housing 106) is preferably opaque in order to reduce or eliminate glare or lens flare occurring in the viewable image produced by camera 116 caused by illumination of light assembly 112.

Figure 6:
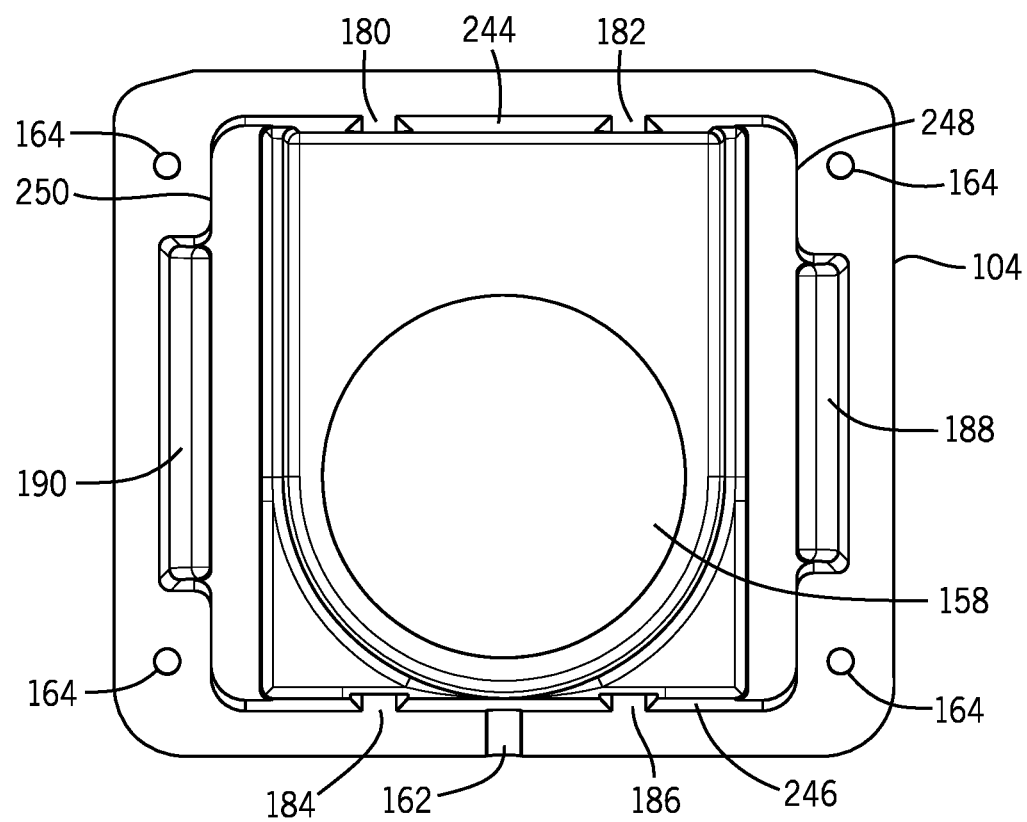
FIG. 6 is a rear view of an embodiment of front camera housing 104.
Figure 7:
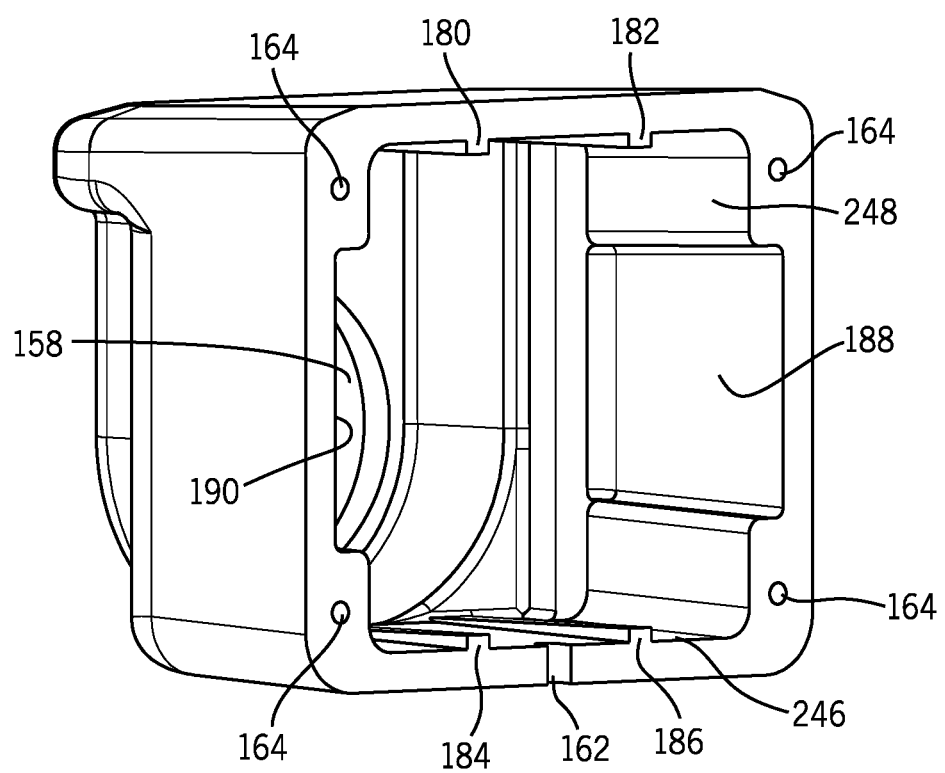
FIG. 7 is a rear perspective view of an embodiment of front camera housing 104.

Turning to FIGS. 6 and 7, a rear view and a rear perspective view of an embodiment of front camera housing 104 is shown. Front camera housing 104 further comprises one receptacle 164 located near each corner of housing 104 (four in the current embodiment) and configured to receive a fastener to secure front camera housing 104 and rear camera housing 106 together. Front camera housing 104 further comprises a first standoff 180 and a second standoff 182 located on a top interior wall 244 of front camera housing 104. Front camera housing 104 further comprises a third standoff 184 and a fourth standoff 186 located on a bottom interior wall 246 of front camera housing 104. First standoff 180 is in line with third standoff 184, and second standoff 182 is in line with fourth standoff 186. First standoff 180, second standoff 182, third standoff 184 and fourth standoff 186 are configured to be in communication with camera 116, thereby stabilizing camera 116 within front camera housing 104. Standoffs 180, 182, 184, and 186 may be tapered if desired and it is contemplated first standoff 180 and second standoff 182 may be combined into a single standoff. Likewise, third standoff 184 and fourth standoff 186 may also be combined into a single standoff. Front camera housing 104 further comprises a left receptacle 188 cut into the interior of left wall 248 of housing 104 and configured to receive a right extension 194 of rear camera housing 106 (see FIGS. 8-9 and description below). Likewise, front camera housing 104 further comprises a right receptacle 190 cut into the interior of right wall 250 of housing 104 and configured to receive a left extension 192 of rear camera housing 106 (see FIG. 8 and description below), allowing front camera housing 104 and rear camera housing 106 to align for connection. Last, front camera housing 104 further comprises egress 162 extending through the bottom wall of housing 104 and is configured to allow liquid and debris drainage to prevent potential damage to camera 116 caused by inclement weather.

Figure 8:
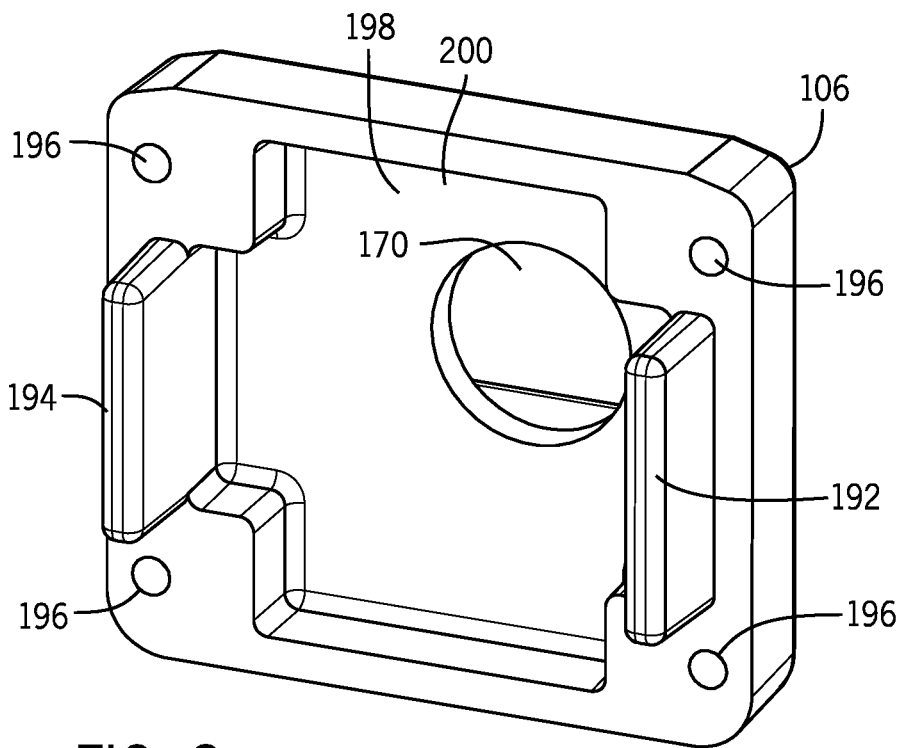
FIG. 8 is a rear perspective view of an embodiment of rear camera housing 106.
Figure 9:
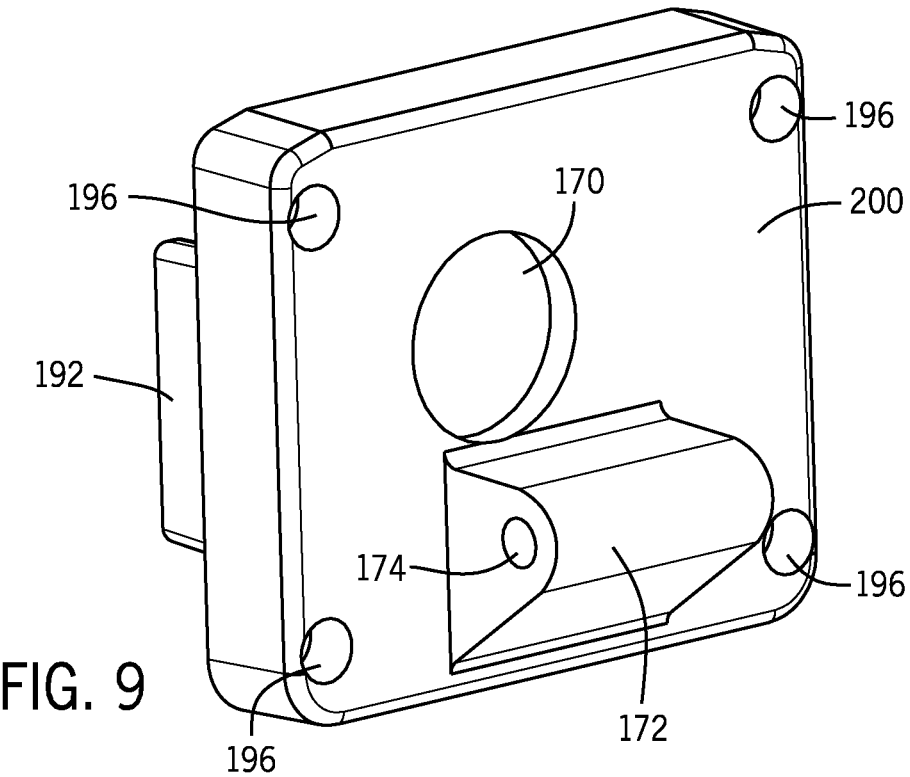
FIG. 9 is a perspective view of an embodiment of rear camera housing 106.

Turning to FIGS. 8 and 9, a rear perspective view and a perspective view of an embodiment of rear camera housing 106 is shown. As mentioned earlier, rear camera housing 106 comprises aperture 170 in rear wall 200 and is configured to allow plug 166 of camera 166 to extend through it. Housing 106 further comprises cavity 198 configured to receive a rear portion of camera 116 and in the current embodiment is the shape of a cross, although other configurations are contemplated to accommodate different camera types (as well as overall different configurations of camera housing 102 pursuant to each camera type, for example see FIGS. 17 and 18). In addition, as mentioned above, rear housing 106 also includes left extension 192 extending away from one side of rear camera housing 106 and right extension 194 extending away from the opposing side of housing 106, both perpendicular to rear wall 200 and in line with one each other. Rear housing 106 further includes at least one passage 196 located near each corner of housing 106 and configured to align with a corresponding receptacle 164 of front camera housing 104 so a fastener can extend through each passage 196 and each corresponding receptacle 164, thereby securing front camera housing 104 and rear camera housing 106 together to enclose and protect at least a portion of camera 116, although other embodiments may include a hinge, clasp, interference fit, or other manners known to connect two parts of a housing together. As shown in FIG. 9, protuberance 172 is generally curvilinear with flat sides and attached to the outside of the rear wall 200 of rear camera housing 106. While protuberance is presently formed integral with rear wall 200, it could be separate. Protuberance 172 is currently located below aperture 170 and extends away from the outside of rear wall 200 of housing 106 a distance which allows camera housing 102, when connected to lower bracket assembly 122, to rotate at least 45 degrees upward and downward from a horizontal base position where camera housing 102 is parallel with first flange 142 and second flange 144 of lower bracket assembly 122.

Figure 10:
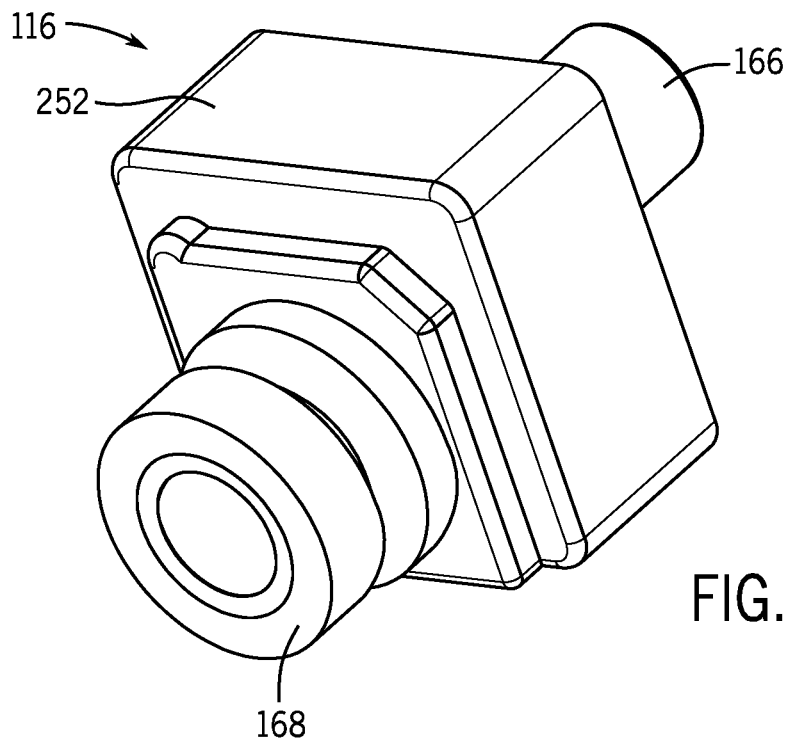
FIG. 10 is a perspective view of an embodiment of camera 116.
Figure 11:
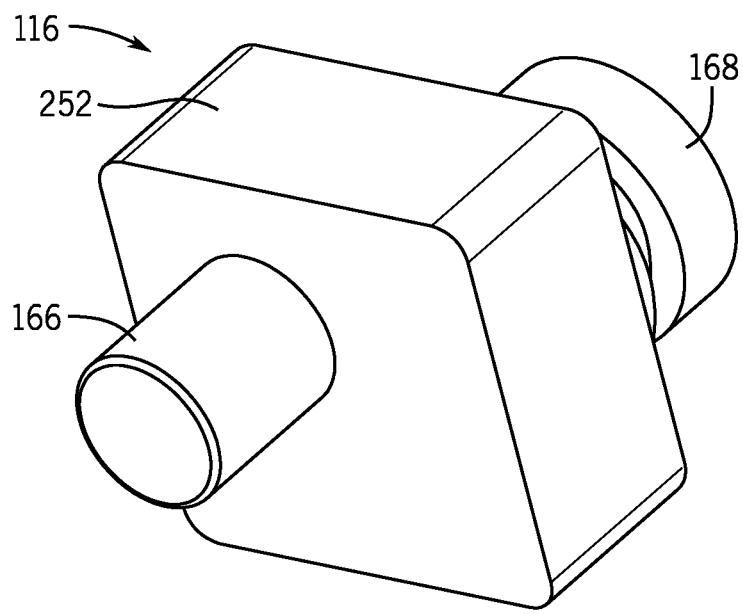
FIG. 11 is a rear perspective view of an embodiment of camera 116.

Turning briefly to FIGS. 10 and 11, a perspective view and a rear perspective view of an embodiment of camera 116 is shown. While camera 116 currently comprises a body 252, a lens 168, and a plug 166, the embodiment shown is also known as GM® part #84929557 and sold with GM® brand trucks since 2019. It is contemplated that different embodiments of cameras and camera housings 102 may be configured to hold and secure each camera type to a light assembly 112 via bracket 108, which allows the same bracket 108 to be utilized with a variety of camera types, all of which can be attached to the same multitude of light assemblies 112.

Figure 12:
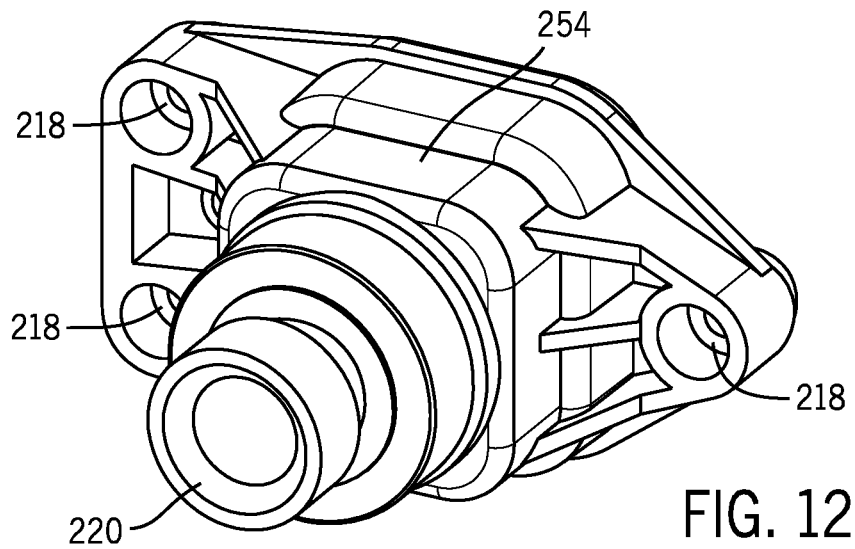
FIG. 12 is a perspective view of alternative embodiment 216 of camera 116.
Figure 13:
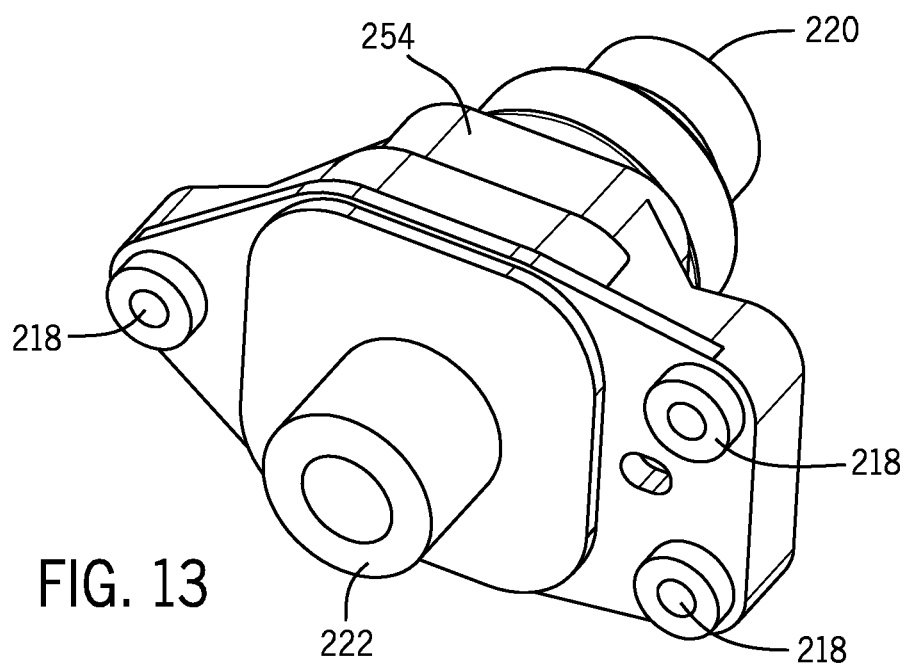
FIG. 13 is a rear perspective view of alternative embodiment 216 of camera 116.

Turning to FIGS. 12 and 13, perspective view and a rear perspective view of an alternative embodiment of camera 216 is shown. While camera 216 comprises a body 254, a lens 220, three openings 218 formed therethrough, and a plug 222, the alternative embodiment shown is also known as RAM® part #68448640AA. Further, two openings 218 are located on one side of camera 216 and the third opening 218 is located on the opposing side.

Figure 14:
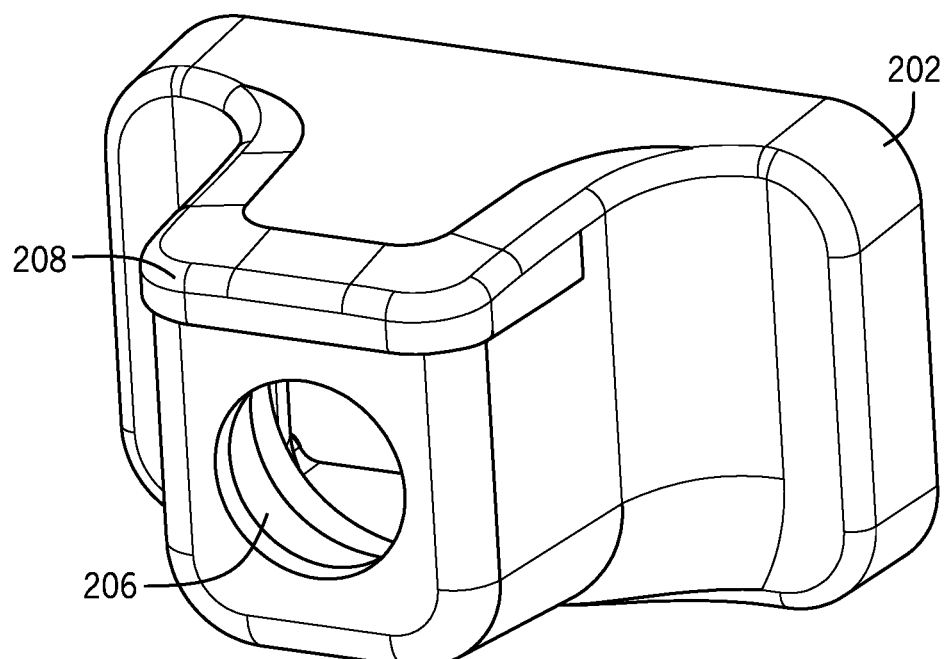
FIG. 14 is a perspective view of an alternative embodiment 202 of front camera housing 104.
Figure 15:
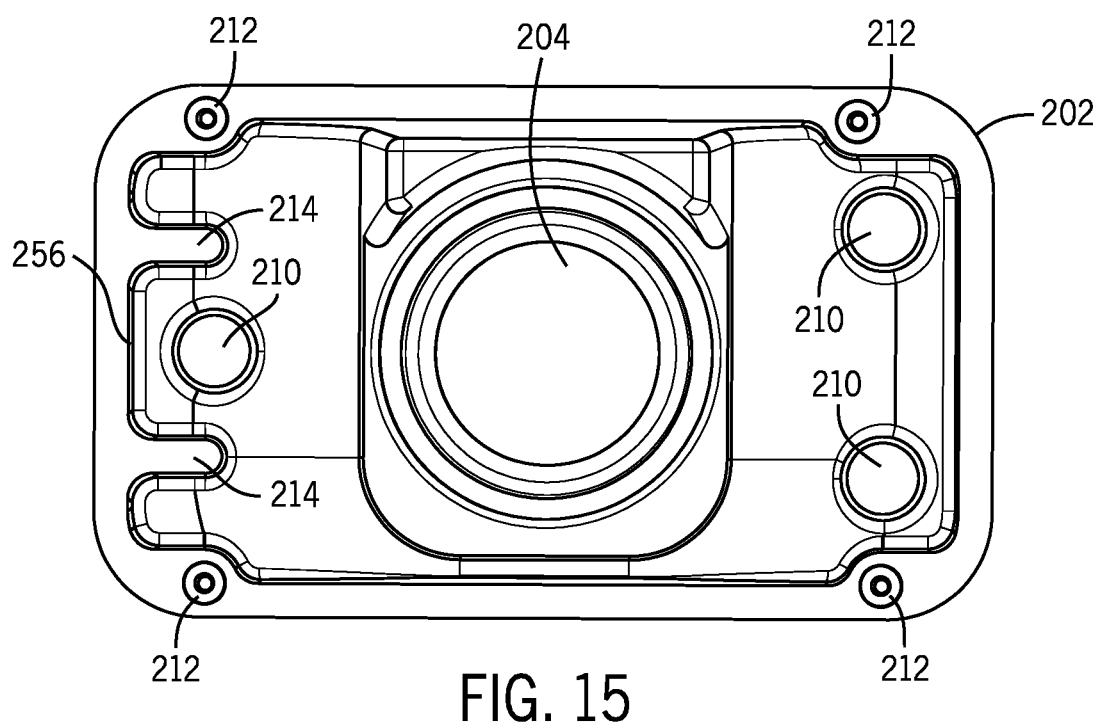
FIG. 15 is a rear view of an alternative embodiment 202 of front camera housing 104.
Figure 16:
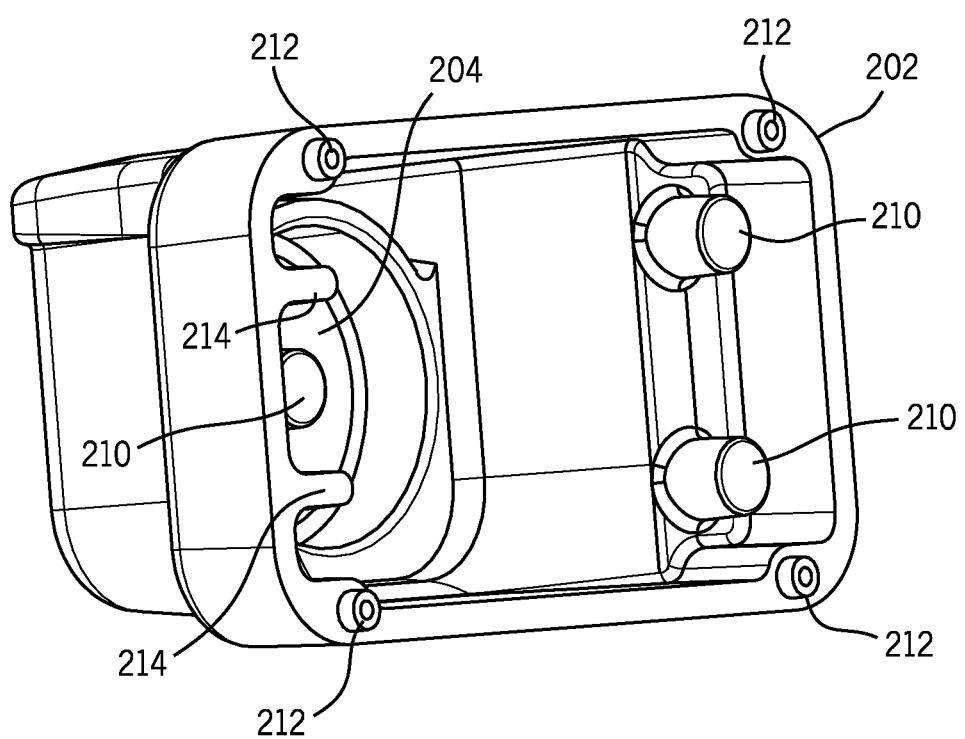
FIG. 16 is a perspective view of an alternative embodiment 202 of front camera housing 104.

Turning to FIGS. 14, 15, and 16, a perspective view, a rear view, and a rear perspective view of an alternative embodiment 202 of front camera housing 104 is shown. As an example of another possible camera housing embodiment to enclose a different camera, in this case camera 216, alternative front camera housing 202 still includes an aperture 206 formed therethrough the front of alternative front camera housing 202 and a hood 206 located around the top of housing 202 and extending away from the front, at least a port of the right side, and at least a portion of the left side of the housing and is configured to keep rain and debris away from lens 220 of an enclosed camera 216. Housing 202 however is generally "T" shaped in order to accommodate the relatively "T" shape of body 254 of camera 216. Turning to FIG. 15, housing 202 further comprises three pegs 210 configured to slidably communicate with the three corresponding openings 218 of camera 216 in order to further secure camera 216 within front camera housing 202. In the current embodiment one peg 210 is centrally located on the interior of the right side of housing 202 and the other two pegs 210 are located on the interior of the left side of housing 202. In order to further secure camera 216 from movement within housing 202, housing 202 further comprises two standoffs 214 located on interior side of the right wall of housing 202 and extending from interior wall 256 where one standoff 214 is located on each side of peg 210, which acts to limit movement of camera 216 if peg 210 on the right interior side of housing 202 should disengage with its corresponding opening 218 of camera 216. Housing 202 further comprises one receptacle 212 located near each corner of housing 202 (four in this alternative embodiment) and configured to receive a fastener to secure front camera housing 202 and rear camera housing 204 together.

Figure 17:
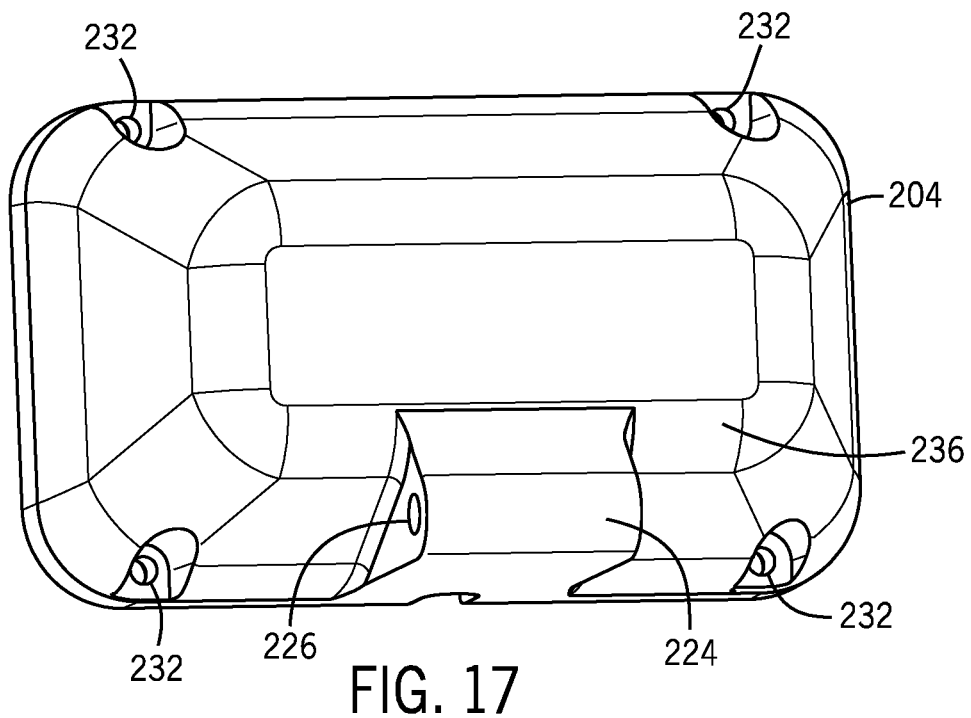
FIG. 17 is a perspective view of an alternative embodiment 204 of rear camera housing 106.
Figure 18:
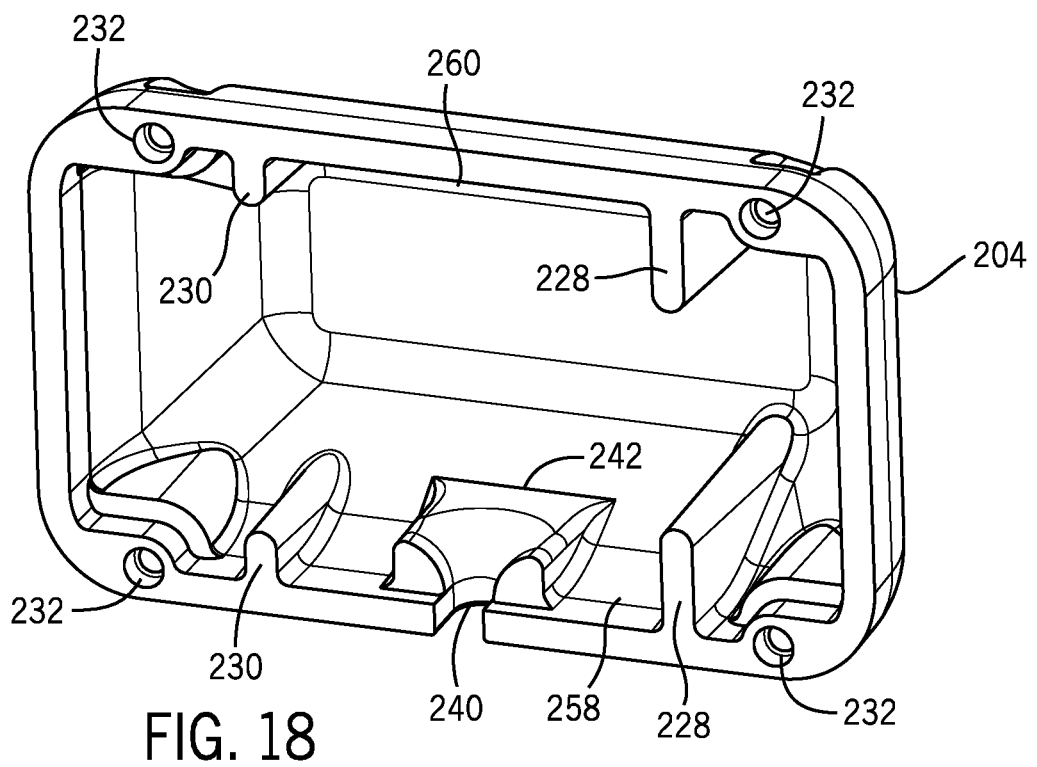
FIG. 18 is a rear perspective view of an alternative embodiment 204 of rear camera housing 106.

Turning to FIGS. 17 and 18, a perspective view and a rear perspective view of an alternative embodiment 204 of rear camera housing 106 is shown. Rear camera housing 204 also has a protuberance 224 with a through hole 226 formed therethrough and configured to attach to bracket 108 via camera housing fastener 124, where protuberance 224 extends from the outside of a rear wall 236 of housing 204. Protuberance 224 is currently centrally located on the bottom of real wall 236. Further, housing 204 further includes at least one passage 232 located near each corner of housing 204 and configured to align with a corresponding receptacle 212 of front camera housing 202 so a fastener can extend through each passage 232 into each corresponding receptacle 312, thereby securing front camera housing 202 and rear camera housing 204 together. Turning to FIG. 18, the interior of housing 204 comprises a bottom interior wall 258 and a top interior wall 260. Housing 204 further comprises a first standoff 228 located on the right side of top interior wall 260 and extends toward the bottom interior wall 258 and a second first standoff 228 located on the right side of the bottom interior wall 258 and extends toward the top interior wall 260. Both standoffs 228 are in line with each other and to configured to communicate with the back of camera 216 in order to secure it within front camera housing 202 and rear camera housing 204 when they are secured together. To achieve the same purpose on the interior left side of housing 204, second standoff 230 extends from the top interior wall 260 toward the bottom interior wall 258 and an additional second standoff 230 extends from the bottom interior wall 258 toward the top interior wall 260, where both standoffs 228 are in line with each other and to configured to communicate with the back of camera 216.

First standoff 228 is longer than second standoff 230. Housing 204 may comprise a third standoff 240 centrally located on the bottom interior wall 258 of housing 204 and configured to communicate with a portion of the back of camera 216 to limit its extension into the interior of housing 204. Third standoff 240 further defines an egress 240 therethrough the bottom of housing 204 and configured to allow camera cable 110 to pass through it. Further, standoffs 228, 230, and 240 as well as the depth of housing 204 are configured to allow camera cable 100 to attach to plug 222 of camera 216 and bend around camera 216 within housing 204 and exit through egress 240, where cable 110 eventually connects to a device for display and/or processing of camera data.

A method for attaching a camera to a vehicle including the steps of enclosing at least a portion of the camera within a camera housing, attaching an adjustable bracket to the camera housing, attaching the bracket to a light assembly on the vehicle, attaching a camera cable to the camera, threading the camera cable through the light assembly (via the notch in the current embodiment), and adjusting the camera housing. Alternatively, if a camera already exists on the vehicle, the camera cable from this already existing camera can be removed and attached to the camera within the camera housing.

While the present invention has been described above in terms of specific embodiments, it is to be understood that the invention is not limited to these disclosed embodiments. Many modifications and other embodiments of the invention will come to mind of those skilled in the art to which this invention pertain, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings. Likewise, where this document refers to technologies that would be apparent or known to one of ordinary skill in the art, such technologies encompass those apparent or known to the skilled artisan now or at any time in the future.

The invention claimed is:

1. A camera apparatus comprising:
   a camera housing configured to at least partially enclose a digital or analog camera; and
   a bracket comprising an upper bracket assembly and a lower bracket assembly attached to the camera housing and configured to secure to a light assembly with a lip;
   wherein the upper bracket assembly is in slidable communication with the lower bracket assembly and the bracket allows rotation of the camera housing in relation to the light assembly.

2. The apparatus of claim 1 wherein the bracket is configured to attach to a lip of the light assembly.

3. The apparatus of claim 2 wherein the upper bracket assembly and the lower bracket assembly are each further comprised of at least one hook configured to connect to the lip of the light assembly.

4. The apparatus of claim 3 wherein the at least one hook of the upper bracket assembly is vertically moveable in relation to the at least one hook of the lower bracket assembly.

5. The apparatus of claim 3 wherein the at least one hook of the upper bracket assembly faces the at least one hook of the lower bracket assembly.

6. The apparatus of claim 1 wherein the upper bracket assembly and lower bracket assembly are configured squeeze the lip of the light assembly.

7. The apparatus of claim 1 wherein the camera housing further comprises a protuberance with a through hole formed through it and the lower bracket assembly further comprises at least two flanges which are in line with one another and each have an apertures formed therethrough.

8. The apparatus of claim 7 wherein the apparatus further comprises a fastener configured to screw into the at least two flanges and extend through the through hole of the protuberance, wherein the protuberance is configured to fit between the at least two flanges.

9. The apparatus of claim 1 wherein the bracket is configured to attach to a light assembly on a vehicle.

10. A camera system comprising:
a camera housing configured to enclose a digital or analog camera;
a bracket attached to the camera housing and configured to secure to the outside of a light assembly by squeezing it; and
a digital camera or an analog camera at least partially enclosed by the camera housing;
wherein the bracket allows rotation of the camera housing along at least one axis.

11. The camera system of claim 10 wherein the bracket is configured to attach to the back of the camera housing.

12. A method for relocating a camera on a vehicle comprising: at least partially enclosing a camera within a camera housing, attaching the camera housing to an adjustable bracket, attaching the bracket to a light assembly on the vehicle by sandwiching the light assembly within the bracket, attaching a camera cable to the camera, and adjusting the camera housing.

13. The method of claim 12 wherein the method further includes the step of installing a notch in the light assembly and threading the camera cable through the notch.

14. A camera apparatus comprising:
a light assembly with a lip, the light assembly configured to attach to a vehicle;
a camera housing configured to at least partially enclose a digital or analog camera; and
a bracket configured to attach to the camera housing and configured to secure to the lip of the light assembly by squeezing it;
wherein the bracket allows rotation of the camera housing in relation to the light assembly.

15. The apparatus of claim 14 wherein the lip further comprises a notch configured to allow a cable to extend through it.

16. The apparatus of claim 14 wherein the lip further comprises an aperture formed therethrough configured to allow a cable to extend through it.

* * * * *